United States Patent [19]

Thompson

[11] Patent Number: 4,968,516

[45] Date of Patent: Nov. 6, 1990

[54] METHOD AND APPARATUS FOR COOKING FOODSTUFFS USING AUXILIARY STEAM

[76] Inventor: Neal W. Thompson, 91 Belvedere St., Pittsburgh, Pa. 15205

[21] Appl. No.: 383,416

[22] Filed: Jul. 24, 1989

[51] Int. Cl.[5] ............................ A23L 1/00; A47J 27/00
[52] U.S. Cl. ........................................ 426/233; 99/326; 99/330; 99/336; 99/407; 426/438; 426/510; 426/523
[58] Field of Search ............... 426/510, 511, 438, 233, 426/523; 99/330, 326, 333, 336, 403, 407

[56] References Cited

U.S. PATENT DOCUMENTS

| | | | |
|---|---|---|---|
| 2,778,736 | 1/1957 | Wagner | 426/438 |
| 2,827,379 | 3/1958 | Phelan | 426/438 |
| 2,914,063 | 11/1959 | Wagner | 426/523 |
| 2,938,648 | 5/1960 | Phelan | 99/403 |
| 3,194,662 | 7/1965 | Nelson | 426/438 |
| 3,245,800 | 4/1966 | Sanders | 426/439 |
| 3,563,158 | 2/1971 | Omer | 99/326 |
| 3,613,550 | 10/1971 | Thompson | 99/330 |
| 3,655,411 | 4/1972 | Albright | 99/336 |
| 3,734,744 | 5/1973 | Albright | 426/231 |
| 3,809,777 | 5/1974 | Thompson | 426/438 |
| 3,816,703 | 6/1974 | Binks | 426/438 |

FOREIGN PATENT DOCUMENTS 59-21356  2/1984  Japan ..................... 426/438

*Primary Examiner*—George Yeung
*Attorney, Agent, or Firm*—Sanford J. Piltch

[57] ABSTRACT

An apparatus and method for cooking small quantities of low and normal moisture content foodstuffs in a sealed pressurized container by immersing the foodstuffs in a heated liquid cooking medium and injecting super-saturated steam into the vessel upon the closure of the lid to which super-saturated steam is generated within a heated injection tube and creates an instant pressure seal and initiates a cycle of repeated vacuum pulse cooking flashes of the moisture and water contained in the foodstuffs placed within the vessel to super-saturated steam as the pressure increases and decreases in accordance with the pressure regulating means for at least the timed cooking period.

17 Claims, 2 Drawing Sheets

METHOD AND APPARATUS FOR COOKING FOODSTUFFS USING AUXILIARY STEAM

BACKGROUND OF THE INVENTION

A known method of preparing certain foodstuffs, e.g. chicken, seafood, various kinds of meats, and the like, is to immerse these foodstuffs in heated oil, shortening or animal fat and cook the foodstuffs until done. This type of food preparation is commonly called deep frying. Establishments handling large quantities of food often resort to deep frying under pressure to meet the demand for fried food. Pressure type deep frying permits the food to be prepared in a relatively short time as compared to open type deep frying.

One problem is common to both the open type and pressure type of deep frying systems, namely, the oil, shortening or animal fat (hereinafter, collectively "oil") has a limited useful life and must be completely replaced at regular intervals. The reason for this limited life is that after a certain period of use the oil breaks down, characterized by foaming, a dark amber color, off flavor, smoking, and formation of gums and residues. The breaking down of the oil is due to the chemical formation therein of a high degree of free fatty acids. These adverse and destructive free fatty acids have been attributed to the breakdown of the chemical bond between the glycerine and fatty acids which make up the oil.

This breakdown is due mainly to hydrolysis, the presence of contaminating impurities in the oil, and sustained use of impurity contaminated oil at high temperatures. The impurities often found in the oil are derived in large part from the food being prepared. For example, chicken during deep frying will release, among other things, a product commonly called "glue". Residual blood remaining in the chicken may also be released.

In addition to the "glue" and blood, other materials such as flour, bread particles, salt, spices and the like forming parts of the covering or breading applied to the chicken will also enter into the oil as part of the total impurities. Straining and filtering the oil helps to add to the effective life. However, most filtering systems, aside from being elaborate, expensive, and awkward, cannot effectively prevent breakdown of the oil since the destructive free fatty acids are formed while the oil is being used at high temperatures to fry food. These free fatty acids remain in solution with the oil, even when cooled, resisting the straining and filtering.

Oftentimes the oil is replaced on a regular basis, usually on the basis of change in color, and is not permitted to be used until it completely breaks down. The reason for this is that the contaminated oil, if not replaced, will give the food an undesirable flavor and unattractive appearance. This is directly attributable to the high degree of free fatty acids in the oil, and the adhesion of carbon particles already formed, as well as the other suspended impurities in the foods.

In addition to causing breakdown of the oil, the impurities transfer an odor or off flavor to the oil. Such odor or off flavor (i.e. taste) being characteristic of the particular food being prepared. For example, the oil used for preparing chicken would smell like the chicken. Odorous oil cannot be used in preparing other foods due to the danger of the odor of one food being transferred to the other food (viz. fishy smelling chicken).

The rate of formation of free fatty acids due to the presence of impurities and moisture in the oil is accelerated when the oil is used at sustained high temperatures. Accordingly, the temperature of the oil is kept relatively low during cooking (e.g., 325° F. to 350° F.). Thus, the cooking time for the food product is necessarily lengthened as compared with oil used at higher temperatures.

As mentioned earlier, hydrolysis is a cause for oil, shortening and animal fat breaking down and is due to excessive amounts of water in the oil. An excessive amount of water in the oil or cooking medium also results in the rapid generation of steam as the medium is heated to high temperatures. This rapid generation of steam also causes violent sputtering which is dangerous to anyone who might be near an open fryer. The sputtering caused by the generated steam also carries some of the oil or other cooking medium into the surrounding environment creating waste. In order to avoid sputtering by generated steam when deep frying refrigerated foods, a common practice has been to pre-heat or blanch the refrigerated foods to eliminate some of the moisture. Aside from necessitating an additional procedure in preparing these refrigerated foods, this pre-heating is unsanitary and can result in food contamination. Some states have recognized this unsanitary danger of pre-heating refrigerated foods by prohibiting restaurants and the like from pre-heating refrigerated foods prior to cooking.

Foods with high moisture content, however, also play an important and favorable role in deep frying operations, and particularly in pressure deep frying. The steam generated from the moisture in the foods being fried circulates through the cooking medium and contacts the food to restore the lost moisture thereby resulting in a tender, moister and tastier food product. However, an additional problem arises, especially in pressure frying, in that the steam, if not properly controlled, can cause the food to become over-cooked. In the case of chicken, for example, the meat can fall away from the bones if overcooked. If the steam is generated too rapidly in open deep frying, thereby not permitted to circulate about the food, the food will tend to char since it will be getting too much heat too fast. Therefore, the temperature of the oil or other cooking medium during the cooking process cannot be raised too high.

One other problem common to both open type and pressure type deep frying is that the food product absorbs and retains a certain amount of the cooking medium which detracts from the taste of the food as well as being another source of waste. The amount of oil, shortening or animal fat absorbed by the food product increases as the length of cooking time increases. The cooking times currently used are unnecessarily long because of the necessity of using low temperatures, as indicated previously. Conscientious restaurants oftentimes use a degreaser or defatter for removing the residual fats in the food products. Degreasing adds a time consuming step to the food processing procedure, with the degreasers or defatters having the additional disadvantages of being expensive and bulky.

Pressure type deep fryers are always explosion problems, especially if operated at very high pressures such as above 35 p.s.i. Furthermore, the food product resulting from the use of the pressure fryers currently existing are not satisfactory, due mainly to the problem with water content and impurities mentioned earlier. The dissatisfaction with high pressure fryers is demonstrated by the scarcity of use of this type of pressure fryer today.

The pressure deep fry systems commonly used are also limited in the amount of food product which can be prepared in individual vessels. One process extensively used is limited in the amount of food prepared in each container to approximately five pounds. This limited capacity has necessitated the use of a large number of containers individually heated on open gas burners in order to meet the demand for food product. After the food is prepared by this process, fat laden steam is released, and the container hand carried to a strainer vat and dumped of all its contents. The fat soaked finished food product is then put into a defatter before being served. Needless to say, the just described process is inefficient, wasteful of valuable oil, shortening or animal fat, dangerous to operators who have to open the containers and carry them to the strainer vats, and very expensive to operate, among various other deficiencies.

Pressure cooking is also used for preparing other food products, such as stewed chicken, pot roasted beef, vegetables, and dough products, for example, with water being used as the cooking medium. The water is either discarded or used as gravy stock, in the case of meats, after the cooking of the products is completed. In the case of pressure cookers used to date, any contaminating foreign material on the products tends to recirculate about the cooking vessel and remain on the product, in the water, or on the walls of the vessel. In other words, there is no way for foreign material to escape from the cooking vessel during cooking.

My earlier cooking system and method of preparing foodstuffs in a heated liquid cooking medium in a pressurized vessel is described in U.S. Pat. Nos. 3,613,550 and 3,809,777. The advances made were improvements in permitting steam generated from heating the foodstuffs to be relieved at a predetermined high limit until a desired pressure is achieved and repeating that cycle until the foodstuffs are completely cooked. Upon completion of the cooking cycle and before opening the vessel, the steam pressure is used to completely discharge the liquid cooking medium from the vessel to a filtering system and then to a reservoir for reuse. Any residual steam is then vented and the vessel can be opened to remove the cooked foodstuffs. This system functioned well for its time but was eventually found to be inefficient for very small amounts of food to be cooked and for foods with a lower water or moisture content.

Further, with the ordinary pressure cooker for deep frying, it is difficult to cook small quantities of foodstuffs as well as foods with low moisture contents, e.g., hamburgers, pork, spare ribs, frozen fish patties, bacon and sausages. These low moisture foods do not give off sufficient moisture to make the pressure seal on the cooking vessel before the cooking medium cooks the outer surface of the food while the inner portions remain raw. Thus, the low moisture foods do not give off sufficient moisture to create enough steam to build the pressure necessary to seal the vessel. In turn, this low moisture content will fail to provide sufficient moist heat to fully cook the inner portions of the food product before the outer portions are overcooked.

Moreover, there were also continuing problems in the area of contaminating the cooking medium after continued reuse and high temperatures breaking down the cooking medium. However, before discussing any of my improvements for cooking foodstuffs in closed vessels using a liquid cooking medium and super-saturated steam, certain other problems must be discussed. It has been argued that elevating frying temperatures for foodstuffs alters the appearance of the liquid cooking medium, i.e. the oil, and the character of the cooked product. The main objective is to produce a low fat fried food of good appearance without adverse effect to the liquid cooking medium through continued reuse. This can only be achieved by alleviating the causes for the breaking down of the liquid cooking medium.

The principal causes of hydrolysis, the cause for the breaking down of the liquid cooking medium, are the reactions of the liquid cooking medium with water and with air. For example, the introduction of a cooking medium containing a triglyceride with water and the addition of heat will cause a chemical reaction producing glycerol and a number of fatty acids. The fatty acids remain soluble in the liquid cooking medium which has lost some of its volume through the reaction. Also, the injection of air, i.e. atmospheric oxygen, to the liquid cooking medium, in order to build pressure in the cooking vessel, will cause a chemical reaction. The fatty content of the liquid cooking medium will react with the oxygen and trace metals from the cooking vessel when heated producing hydroperoxides and various carbonyl compounds (acidic). These resulting chemicals remain soluble in the liquid cooking medium which has, again, lost some of its volume through the reaction. In both cases, the chemical impurities are retained in the cooking medium solution although strained and filtered.

I have improved the present method for elevating pressure in high and low temperature pressure cookers and, thus, eliminated the problem of breaking down the liquid cooking medium in such a way as to create unwanted and undesirable impurities. By introducing super-saturated steam into the cooking vessel from the beginning of the cook cycle, and then throughout the cook cycle at predetermined times (if desired), I have eliminated the injection of air or water into the vessel with its detrimental effects on the liquid cooking medium and on the cooked foodstuffs.

SUMMARY OF THE INVENTION

The introduction of super-saturated steam (instead of air or water) to a closed, but not pressurized, cooking vessel initiates a safe and simple method of cooking small quantities, as well as large quantities, of foodstuffs having a low moisture content. The steam is delivered into the vessel by inserting a metal tube through the vessel wall and then around the periphery of the vessel adjacent the outer wall, all below the fill level of the oil. The external end of the metal tube is connected to a normally closed electrically operated solenoid valve for controlling the water supply to the tube. The internal end of the metal tube has connected to it a nozzle which remains above the oil fill level and controls the delivery of the super-saturated steam by converting the water within the metal tube, which is heated as it travels through the tube, into the super-saturated steam. This steam, upon leaving the nozzle and entering the cooking vessel above the oil fill level, creates an instant seal in the cooking vessel with cooking beginning instantly. The heating of the water within the metal tube is achieved by obtaining heat from the heated cooking medium through conductivity of the metal tube.

The invention may be more specifically defined as an apparatus for cooking foodstuffs in a sealed, pressurized container. The apparatus consists of a sealable pressure vessel having a pressure vent disposed through an upper portion of said vessel for use in cooperation with a pressure regulating means which is responsive to pressure changes in said vessel for opening the pressure vent when the pressure in the vessel reaches a preset high pressure and for closing said pressure vent when the pressure in the vessel reaches a preset low pressure. A selectively moveable lid means is attached to said vessel for use in opening and closing the vessel. A discharge orifice is disposed through a lower portion for discharging a cooking medium placed within said vessel into a reservoir for filtering and storage and a fill orifice is disposed through an upper portion of said vessel for delivering the cooking medium to the vessel. A controllable heating means for heating the cooking medium and a timing means for permitting energy to be applied to the heating means for a predetermined cooking time are also included. A steam injector means operable upon the closure of the lid of the vessel generates super-saturated steam within the vessel creating an instant pressure seal and repeated vacuum pulse cooking flashes of the moisture and water contained in the foodstuffs placed within the vessel to super-saturated steam as the pressure increases and decreases in accordance with the pressure regulating means for at least the timed cooking period.

The pressure regulating means is responsive to pressure within the vessel for opening the pressure vent upon the pressure reaching a high pressure of approximately 15 p.s.i. and for closing said pressure vent upon the pressure reaching a low pressure of approximately 10 p.s.i. The controllable heating means is operable in response to said timing means and a thermal control means to maintain an average preset temperature over the timed cooking period. The steam injector means initiates a series of repeated vacuum pulse cooking flashes of the moisture and water contained in the foodstuffs to super-saturated steam in accordance with the build up and release of pressure within the vessel. The vacuum pulse cooking flashes occur upon the venting of the steam when reaching the high pressure limit creating a temporary partial vacuum in the vessel. The cooking time is selected in accordance with the moisture content of the foodstuffs and the aggregate weight of the foodstuffs to be cooked.

The invention may also be characterized as a method for cooking foodstuffs in a sealed pressurized container. The method comprises the steps of immersing foodstuffs in a sealable pressure vessel containing a liquid cooking medium; heating the liquid cooking medium for a predetermined cooking time; closing a selectively moveable lid means attached to said vessel during said predetermined cooking time; injecting steam into the vessel upon the closure of the lid to generate super-saturated steam within the vessel creating an instant pressure seal and initiating repeated vacuum pulse cooking flashes of the moisture and water contained in the foodstuffs placed within the vessel to super-saturated steam as the pressure increases and decreases in accordance with the pressure regulating means for at least the timed cooking period.

The method may also include the additional steps of discharging the cooking medium through a discharge orifice into a reservoir for filtering and storage under the urging of the pressure of the steam within the vessel after the foodstuffs are substantially cooked and the expiration of the cooking time along with the venting of the vessel of all steam upon completion of the discharging of the cooking medium and the final vacuum pulse cooking flash and removing the foodstuffs by opening the lid after the pressure within the vessel is equalized with the atmospheric pressure outside the vessel by a final venting. An additional step may include delivering the cooking medium to the vessel from the storage reservoir after filtering the cooking medium in the reservoir.

The method for cooking foodstuffs includes the repeated vacuum pulse cooking flashes to super-saturated steam of the moisture and water contained in the foodstuffs which creates a sequenced cycle during the timed cooking period of steam pressure build-up, venting causing a temporary partial vacuum, vacuum pulse cooking flash of steam from the release of additional moisture and water from the foodstuffs upon the occurrence of the temporary partial vacuum giving rise to another build-up of steam pressure.

The method for cooking foodstuffs creates cyclic repeated vacuum pulse cooking flashes to super-saturated steam of the moisture and water contained in the foodstuffs. This sequenced cycle during the timed cooking period includes a steam pressure build-up, venting causing a temporary partial vacuum, and vacuum pulse cooking flashes from the release of additional moisture and water from the foodstuffs upon the occurrence of the temporary partial vacuum giving rise to another build-up of steam pressure.

The method for cooking foodstuffs includes the additional step of removing impurities, fats and other volatiles and unwanted harmful materials from the foodstuffs by the mechanical agitation of the cooking medium and the internal atmosphere of the vessel caused by the vacuum pulse cooking flashes which generates supersaturated steam and the carrying off of these impurities, fats and other volatiles and unwanted materials with the venting of the vessel of the generated steam. This method of repeated vacuum pulse cooking flashes generating super-saturated steam from the moisture and water contained in the foodstuffs creates a bulls-eye pattern of cooking in each individual foodstuff from the periphery inward upon each occurrence of a vacuum pulse cooking flash.

The method also includes the additional step of sterilizing the foodstuffs during the repeated vacuum pulse cooking flashes of the moisture and water contained in the foodstuffs placed within the vessel to super-saturated steam during the timed cooking period. The method also includes the step of reclaiming the stored cooking medium by utilizing repeated vacuum pulse cooking flashes which generate super-saturated steam to remove impurities and other volatile materials from the cooking medium and carrying off said impurities and other volatile materials with the venting of the vessel of the generated steam.

Upon the conclusion of cooking the foodstuffs, the method includes stripping away the surface residue of the cooking medium from the cooked foodstuffs, removing remaining fats in the cooked foodstuffs with the steam generated by the final vacuum pulse cooking flash, and replacing the fats with moisture from said generated steam producing cooked foodstuffs having a moist inside and a crispy outside texture.

An alternative method for cooking small quantities of low or normal moisture content foodstuffs includes the additional step of providing a means for initiating the injecting of super-heated water vapors into the nozzle to generate super-saturated steam within the vessel to assist in the cooking of the small quantities of foodstuffs at a sequenced cyclic time in accordance with the pressure regulating means for at least the timed cooking.

BRIEF DESCRIPTION OF THE DRAWINGS

For the purpose of illustrating the invention, there is shown in the drawings forms which are presently preferred; it being understood, however, that the invention is not limited to the precise arrangement and instrumentalities shown.

DETAILED DESCRIPTION OF THE INVENTION

The following detailed description is of the best presently contemplated mode of carrying out the present invention. This description is not intended in a limiting sense, but is made solely for the purpose of illustrating the general principles of the invention.

Figure 1:
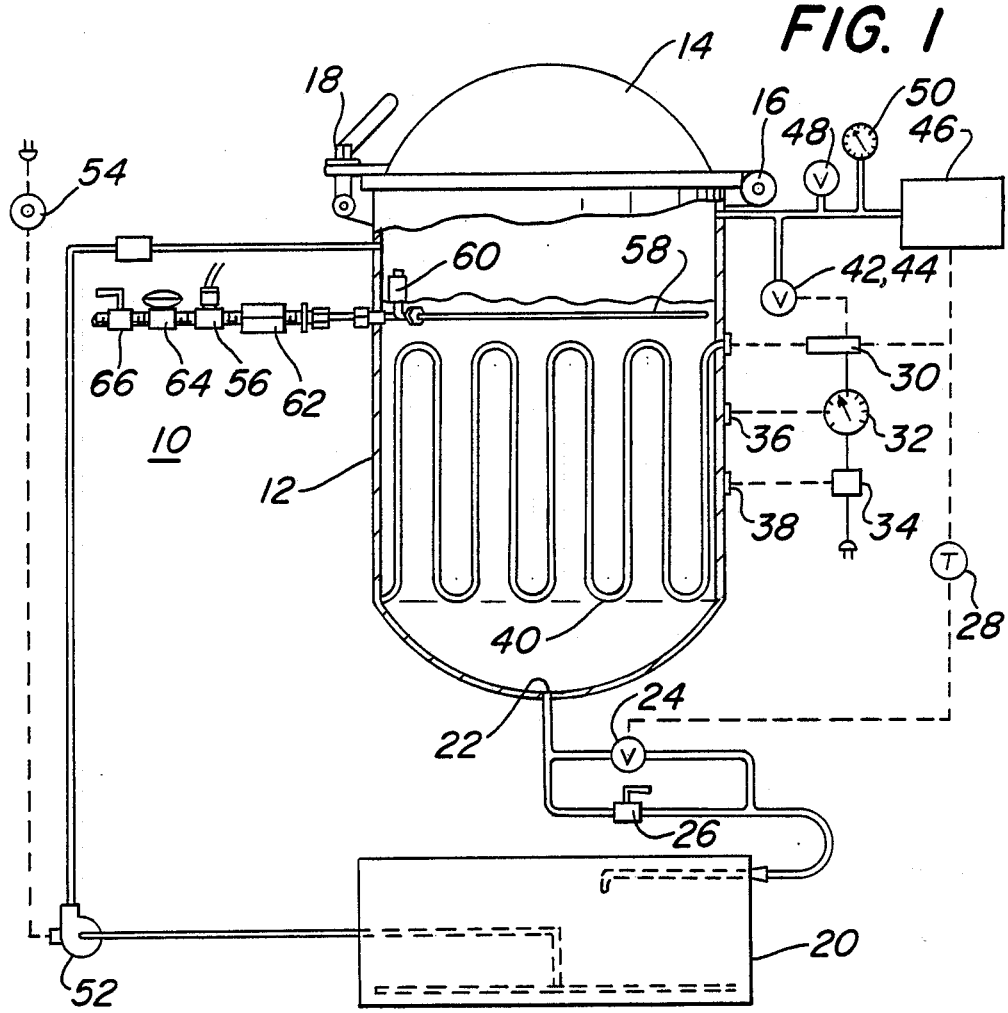
FIG. 1 is a diagrammatical representation of the pressure type cooking system with steam injecting tube and nozzle of the present invention.

Referring now to the drawings in detail, wherein like numerals represent like elements, there is shown in FIG. 1 a diagrammatic representation of the pressure type cooking system 10 of the present invention. The cooking system 10 generally represents a pressure type deep fry system for practicing the present invention. For purposes of clarity of description of the cooking system 10, the cooking medium which will be described for use with the system is from the group of non-aqueous oils, vegetable shortenings and animal fats, which will be collectively referred to hereinafter as the cooking medium, unless otherwise indicated.

The cooking system 10 includes a generally cylindrical high pressure cooking vessel 12 for containing and heating the cooking medium. The cooking vessel 12 is suitably adapted to support several mesh trays (not shown) upon which the foodstuffs are placed for deep frying in the cooking medium. A cover or lid 14 is mounted to the top of the cooking vessel 12 which provides a pressure tight condition. The cover 14 is mounted to the cooking vessel 12 along a portion of its edge by hinge means 16 and sealed through the use of a circumferential gasket between the cover 14 and the cooking vessel 12 and at least one lever-type clamp means 18. It is preferred that two pairs of lever-type clamp means 18 are spaced about the circumference of the opening of the cooking vessel 12 which are adapted to engage yoke-like lugs on the cover 14 to secure the closure.

The cooking vessel 12 communicates with a cooking medium storage reservoir 20 through suitable piping. The storage reservoir 20 is formed from stainless steel and suitably heat insulated. The discharge orifice or drain 22 from the cooking vessel 12 is of a predetermined size to permit only the cooking medium to be expelled from the cooking vessel 12 to the reservoir 20 through a discharge valve 24. Also connected to the discharge orifice 22 is a manual drain 26 having a control lever for discharging fully used cooking medium from the system into a section of the reservoir 20 and held for disposal.

The discharge valve 24 is controlled by a cycle timer 28 which is, in turn, controlled by the cycle controller 30. The cycle controller 30 has as inputs the signal from the temperature controller 32 and the high limit temperature switch 34. Both the temperature controller 32 and the high limit temperature switch 34 have connected to them temperature sensors 36, 38, which measure the actual temperature of the cooking medium and transmit a signal to each of the aforementioned elements 32, 34, respectively. From the signals received from the temperature controller 32 and the high limit temperature switch 34, the cycle controller 30 calls for heating of the cooking medium by the heating coil 40. The heating coil 40 is located in the lower portion of the cooking vessel 12 in order that it be totally immersed in the cooking medium during most of the cooking cycle for the foodstuffs.

The cycle controller 30 also controls the steam purge solenoid valve 44 which vents the atmosphere of the cooking vessel 12, i.e. steam and water vapor, to escape into a suitable drain line to a waste water disposal pipe (not shown). A high/low pressure switch 46 which is attached to the cooking vessel atmosphere escape pipe, along with a safety relief valve 48 and a pressure gauge 50, generates a signal to the cycle controller 30 indicative of the pressure existing inside the cooking vessel 12. The cycle controller 30 will cause the steam purge solenoid valve 44 to open when the internal pressure of the cooking vessel 12 exceeds a preset high pressure limit. The steam purge solenoid valve 44 will remain open until the internal pressure of the cooking vessel 12 falls below a low pressure limit. These values are usually 15 p.s.i. for the high limit and approximately 10 p.s.i. for the low limit.

The cycle controller 30, upon receiving appropriate, within range temperature and pressure signals from the temperature controller 34 and high/low pressure switch 46, generates a signal to the cycle timer 28 for controlling the recirculation of the heated cooking medium through the discharge valve 24. The cooking medium is forced by generated steam pressure to return to the reservoir 20 through the discharge orifice 22. The cooking medium is returned to the cooking vessel 12 by means of a recirculating pump 52 when needed for cooking additional foodstuffs. A switch 54 applies power to the recirculating pump 52 for reintroducing the liquid cooking medium into the cooking vessel 12 through an inlet check valve 42. The check valve 42 prevents pressure backflow of any fluid, steam, water vapor, or cooking medium through the cooking medium fill orifice in the side of the cooking vessel 12.

Reference can be had to U.S. Pat. Nos. 3,809,777 and 3,613,550 for additional description of the basic elements, operational characteristics and functionality of the various above-described elements. The description presented in the referenced patents shall be included in its entirety as if recited again herein.

Before continuing with the description of the improvement to the pressure deep frying system, a short discussion of the cooking method is in order. If one would consider a food product's most dense cross-section as a "bullseye target" with concentric rings, the steam initially injected and the recurring vacuum pulse cooking flash of additional steam increases the cooking efficiency of the cooking medium. Hence each concentric ring may be considered a layered section of the food product that is processed (cooked) upon each vacuum pulse cooking flash within the cooking vessel 12.

For example, using an initial condition of a 90% water product, a cooking medium temperature of 400° F., and a pressure differential or range of 14–10 p.s.i. (considering 14 p.s.i. the preferred cooking pressure), all the water above 248° F. will be steam and that below will be liquid. When the pressure builds to greater than 14 p.s.i., the cycle controller 30 responds to the high/low pressure switch 46 reducing the pressure in the cooking vessel 12 to 10 p.s.i. by opening the purge valve 44. This release of pressure creates a temporary vacuum of 4 p.s.i. which, in turn, reduces the product's water boiling point to 240° F. By continuing the cooking cycle, the food product water content is being flashed into steam with each vacuum pulse. Since the temperature gradient in the food product will vary from 400° F. on the outside of the product to less than 240° F. at its densest point, the cooking is carried out in layered stages.

When the water content of the food product is entirely vaporized, all of the volatiles and impurities are carried away with the steam. As the water and moisture content is removed from the food product, a higher temperature can be obtained for cooking the product which results in a shorter cooking and sterilization time.

Introducing the injected steam into the cooking vessel at the appropriate time is done in the following manner. Referring first to FIG. 1, a water solenoid valve 56 and incorporated time delay relay control the water inlet to a metal heating and delivery tube 58 located about the internal periphery of the cooking vessel 12 at or just below the fill line for the cooking medium. At the distal end of the tube 58 is a nozzle 60 for delivery of the super-saturated steam. Also in the water delivery piping is a water inlet check valve 62, for preventing backflow of any steam or water vapor, and a water pressure regulator 64, to deliver water at a preset maximum pressure. A water control valve 66 permits the introduction of water into the delivery system to be controlled for delivery to the cooking vessel 12 by the water solenoid valve 56.

The thermodynamic principles involved in the heat transfer of the cooking process of the instant invention may be understood as follows. Heat energy is transferred from a system at a higher temperature to a system at a lower temperature solely as a consequence of the temperature difference between the two systems. When the temperature of a vapor is greater than the saturated temperature of the vapor corresponding to the pressure of the atmosphere in which the vapor exists, the vapor is said to be super-heated. Hence, steam, one form of water vapor, existing at 14.7 p.s.i. and 220° F. has 8 degrees of super-heat.

As pressure is a consideration for a complete understanding of the thermodynamic principles pertaining to vapors, a short discussion follows. There are two particular types of pressure relationships involving heat transfer, one for solids and one for liquids. These are the Constant Pressure Process and the Constant Volume Process, respectively. All of the pressure cookers in use today use the constant pressure process. An improved method, beyond that which was described in my earlier patents, using a variation in pressure has been found to work extremely well.

Latent heat of vaporization is the heat required to vaporize a unit mass of liquid at constant pressure and temperature. Heat of fusion is little affected by pressure change. However, heat of vaporization is greatly affected by a change in pressure. A vacuum cooking pulse flash will occur in the foodstuffs when the temperature is held constant and the pressure is reduced within a predetermined range. This reduction in pressure causes a vacuum in the closed cooking vessel, which vacuum is applied to all of its contents, including the foodstuffs. The vacuum forces out of the foodstuffs heavy moisture and water converting this mass into super-heated steam vapors.

The vacuum pulse cooking flash achieves a quicker heat transfer in a pressure cooker system without additional consumption of externally supplied heat energy. It was found that the increasing and decreasing of vapor pressure removed the heavy moisture and excess water from the foodstuffs during the transition from high to low pressure and back to high pressure again. A consequence of this process is the significant, but controlled, increased heating of the internal temperature of the foodstuffs during the repeated vacuum pulse cooking flash process. Thus, the foodstuffs may be cooked with a lesser amount of external heat energy applied for a shorter cooking time with more efficient cooking through the controlled use of moisture from within the foodstuffs.

An added circumstance of cooking in accordance with the present invention is the sterilization of the foodstuffs being cooked. The vapor pressure of water above 120° C. [248° F.] is 29.717 p.s.i. (Sterilization begins at 121° C.) The internal temperature and vapor pressure of the foodstuffs approximates 126° C. [258.8° F.] and 34.712 p.s.i., respectively, before the vacuum pulse cooking flash releases the super-heated vapors to the atmosphere internal to the cooking vessel. This is interpreted to mean that, for 35% of the cook cycle of the foodstuffs, the foodstuffs are being sterilized, as well as being cooked thoroughly. The process has been found to produce a bacteria free product with at least three times longer than normal shelf life. The shelf life being that period of time in which the foodstuffs are stored before consumption.

Figure 2:
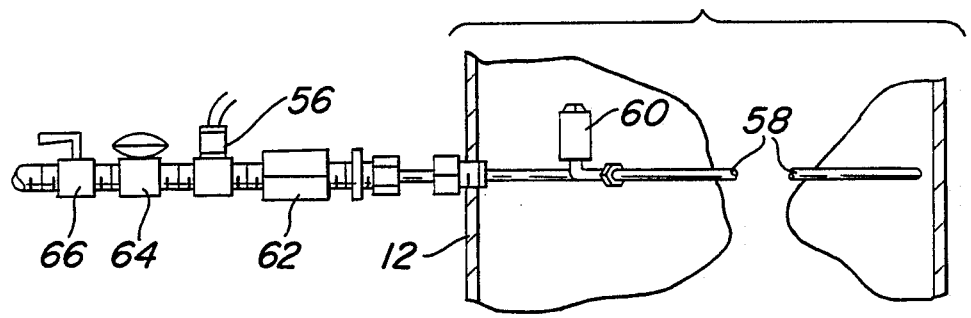
FIG. 2 is a fragmentary view of the steam injecting tube and nozzle of FIG. 1.
Figure 3:
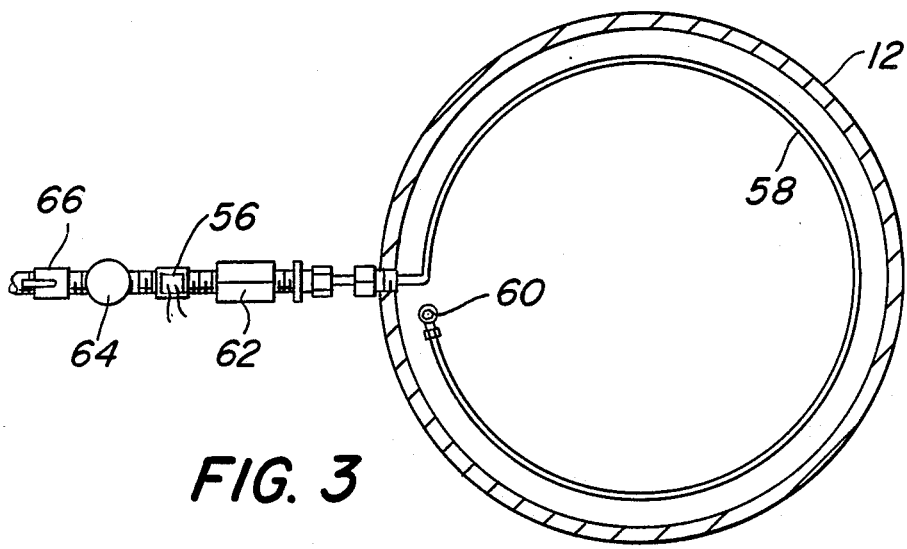
FIG. 3 is a top view of a segment of the cooking vessel of FIG. 1 with the lid removed.

Referring now to FIGS. 2 and 3, the steam injector means is shown in particular relation to the cooking vessel 12. A look from the top of the cooking vessel 12, with the cover 14 removed, shows the tube 58 located about the internal periphery of the cooking vessel in close proximity to the outer wall of the cooking vessel 12. The tube 58 is inserted through the wall of the cooking vessel 12 by using suitable piping and gaskets to prevent liquid or pressure leaks.

The water delivery to the tube 58 is controlled by the water solenoid valve 56 which is connected to a source of water having an inlet pressure of approximately 30 p.s.i. The inlet pressure is controlled by the water pressure regulator 64. To prevent a reversing of the direction of flow of the water, the water inlet check valve 62 has been inserted between the solenoid valve 56 and the delivery tube 58. In accordance with the cooking cycle, the time delay relay, incorporated within the solenoid valve 56, delivers water into the tube 58 for heating and injection into the vessel atmosphere as super-saturated steam. [Water flow direction into the water solenoid valve 56 is indicated by the arrows in FIGS. 2 and 3.]

Once the water has been introduced into the tube 58, it is heated as it travels through the tube by conduction of heat from the cooking medium. Upon exiting the tube, the super-heated water vapor is introduced into a nozzle 60 which converts the water into super-saturated steam and injects the steam into the cooking vessel atmosphere.

The nozzle 60, oriented in a vertical direction with its exit point located above the maximum fill level for the cooking medium, has a hollow cone with a preset volume for delivering a fixed volume of steam vapor. In this manner the super-saturated steam is delivered to the super-cooking vessel atmosphere above the heated cooking medium, and not into the cooking medium.

The water solenoid valve 56 is actuated through control signals received from the time delay relay. The relay coil is powered when a lock switch, incorporated in one or more of the lever-type clamp means 18, is closed. The time delay relay signals the solenoid valve 56 to open for a preset time period. The time periods range between 0.1 to 5.0 seconds and are manually preset. The range enables setting the time to deliver the required amounts of water to assist in the cooking of a variety of food products from a completely dry product to others of varying moisture content having varying weights.

The water heating and delivery tube 58 is of sufficient length to traverse almost the entire internal circumference of the cooking vessel 12 without overlapping itself and with sufficient space to permit the attachment of the steam generating nozzle 60. The tube 58 is preferred to have a thin wall design to take advantage of the heat applied through convection and conduction and yet be sufficiently strong to withstand the water pressure. The nozzle 60 is constructed so as not to require a flow metering device. Delivery of the super-saturated steam by the nozzle 60 is precisely controlled by the fixed capacity of the flow through the hollow cone of the nozzle for the period of time preset in the time delay relay.

The operation of the cooking system 10 is as follows. When the cooking medium has reached the desired temperature, the foodstuffs are lowered into the cooking vessel 12 and the lid 14 is closed. There is no pressure in the vessel. The cooking cycle controller 30 initiates and responds to various signals and conditions of the system. Upon the closing of the lid 14 the high/low pressure switch 46 detects a low pressure atmosphere within the cooking vessel 12. This signal causes the cycle controller to close the purge solenoid valve 44. To insure the seal between the lid 14 and the cooking vessel 12, steam is generated by the introduction of water to the cooking system through the tube 58 and nozzle 60 as controlled by the timer incorporated in the water solenoid valve 56. As the water courses through the tube 58, it is heated by convection and conduction through the wall of the tube by the tube being immersed in the heated cooking medium. This heating causes the water to become super-saturated steam as it exits the nozzle 60. This singular introduction of the steam to the vessel atmosphere causes an instantaneous seal at the juncture of the lid 14 and the cooking vessel 12. Internal cooking temperatures rise immediately due to vapor expansion.

As pressure builds within the cooking vessel due to the heating of the cooking medium and the introduction of the generated steam, the high/low pressure switch 46 senses the maximum internal atmospheric pressure permitted within the cooking vessel 12 for cooking of the foodstuffs in accordance with the present invention. When this signal is detected by the cycle controller 30, the steam purge solenoid valve 44 is opened to relieve the pressure.

As the internal pressure in the cooking vessel 12 drops, a temporary vacuum is created drawing moisture and water from the food. This occurrence causes the first vacuum pulse cooking flash. The moisture and water content drawn out of the foodstuffs is instantly converted to super-saturated steam upon coming into contact with the hot cooking medium. The super-saturated steam percolates up through the cooking medium to again build pressure in the cooking vessel.

When the low pressure limit of the allowable pressure range is reached, the high/low pressure switch 46 senses that the low pressure limit has been reached. This condition is detected by the cycle controller 30 and a signal is sent to the steam purge solenoid valve 44 to close. Once the steam purge solenoid valve 44 is closed, the pressure can again build up by the heating of the cooking medium and the conversion of the moisture and water content of the foodstuffs to steam. Upon the re-opening of the steam purge solenoid valve 44, a temporary vacuum in the cooking vessel 12 occurs again and a second vacuum pulse cooking flash begins. The vacuum pulse cooking flash cycle is repeated for the appropriate cooking cycle for the foodstuffs being cooked.

The cyclic vacuum pulse cooking flash will cause appreciable mechanical agitation in the cooking medium and internal atmosphere of the cooking vessel 12. This mechanical agitation will assist in vapor flashing and heat transfer between and among the heating source and the foodstuffs resulting in a much shortened cooking time. The mechanical agitation will also remove impurities in both the foodstuffs and the cooking medium by carrying these impurities off with the exhaustion of the super-saturated steam.

When the cooking cycle is completed, the cycle timer 28 will have timed out causing the discharge valve 24 to open in response to a motorized actuator associated therewith regardless of the position of the steam purge solenoid valve 44. The next vacuum pulse cooking flash will assist in the evacuation of the cooking medium from the cooking vessel 12 through the discharge orifice 22. The specific size of the orifice 22 prevents the escape of the steam with the cooking medium. Hence, the cooking medium is urged away from the foodstuffs by the steam and into the reservoir 20 for filtering of particulate materials in the cooking medium. After filtering, the cooking medium will be stored until needed. Should there be an increase in pressure due to a very high moisture content in the foodstuffs, this pressure will be relieved by the completion of a vacuum pulse cooking flash cycle without disturbing the discharge sequence.

When all of the cooking medium has been emptied from the cooking vessel 12, the pressure increases in the vessel due to the steam coming into contact with additional heated surfaces of the vessel 12. The higher temperature and pressure causes a final vacuum pulse cooking flash to occur. The final vacuum pulse cooking flash will steam clean the foodstuffs by stripping away the surface residue of the cooking medium from the cooked foodstuffs. Also, the final vacuum pulse cooking flash will force out of the cooked foodstuffs additional lymphatic and cellular fats contained in the fibers of the cooked foodstuffs and, at the same time, dry the outer surface of the foodstuffs to provide a crispy product.

The high pressure limit switch 46 senses a build up of steam pressure which causes the opening of the steam purge solenoid valve 44 permitting the escape of the steam from the cooking vessel 12. As the cook cycle has timed out, the source of heat is removed and the cooked foodstuffs allowed to cool. Further, the low pressure limit is sensed but, due to the timing out of the cook cycle, the steam purge solenoid valve 44 remains open to exhaust the steam from the cooking vessel 12 and reduce the internal pressure so that the vessel may be opened and the cooked foodstuffs removed. When the internal pressure is relatively 0 p.s.i. the cooking vessel 12 becomes filled with heavy distilled water vapors. The cooked foodstuffs return to its original state squeezing out any additional fat and absorbing the sterile water vapors. Thus, a moist, tasty, eye appealing product, low in fats, cholesterol and calories, is provided. The lid 14 can then be opened and the cooked foodstuffs removed. Closure of the lid 14 after placing other foodstuffs to be cooked in the vessel 12 will restart the cooking process.

Today everyone is looking intently at ways of reducing fat and cholesterol intake. An analysis and characterization of oil fats and fat by-products finds that fatty acids are primarily found in milk fats and coconut, palm and related vegetable oils. These fatty acids are readily separable from the cooking medium by a volitization process. Fats of higher molecular weight acids can be removed by a distillation process. Steam distillation at atmospheric pressure is the favored procedure. However, the complete separation of glyceride and other fat mixtures is a utopian aim.

The vacuum pulse cooking flash process is a simple and effective method to remedy this complicated problem by carrying off the various impurities and fats through both volitization and distillation. With each vacuum pulse cooking flash, the cooking medium is filtered by the steam stripping away a variety of volatiles, rancid odors, harmful impurities, pesticide residues, and like unwanted and undesirable materials from the foodstuffs.

The benefits of using the vacuum pulse cooking flash are many. At the end of the cooking cycle, the final vacuum pulse cooking flash separates the cooking medium from the cooked food preventing the food from absorbing and retaining a portion of the cooking medium which may prove harmful to health, as well as increase the cost of operating by reducing the volume of the cooking medium. The vacuum pulse cooking flash requires the filtering of the cooking medium after each and every cooking cycle. Filtering is not left to an employee to decide when the cooking medium should be filtered. The required filtering translates into an extended life for the cooking medium. Filtering may also provide a longer shelf life for the cooked food as well as a better tasting product. The vacuum pulse cooking flash provides a purer cooking medium having less carbons and other impurities. With a purer cooking medium, food can be cooked faster at a higher temperature. The ability to cook at higher temperatures renders out cellular and lymphatic tissue fats providing a tastier, lower calorie product.

A common problem in institutional kitchens, i.e., private clubs, seasonal resorts, military commissaries, churches, etc., is the lack of daily use. When a cooking medium in open fryers or closed pressure fryers is not used for a period of several days, the cooking medium deteriorates rapidly becoming rancid and odorous. These characteristics will greatly affect the quality and appearance of the food. This problem has been resolved by the present invention by utilizing the vacuum pulse cooking flash. The cooking medium can be steamed clean before the food is placed in the cooking medium. After a limited number of vacuum pulse cooking flashes, impurities will be removed along with the rancid odor and the cooking medium will be ready for use. Thus, vacuum pulse of the present invention provides instant super-saturated steam for removing any impurities in the cooking medium by steam distillation in a relatively short period of time.

A variety of meats, such as hamburgers, sausages, bacon, ribs and chops, are high cholesterol foods enjoyed by most people. However, the method by which these low moisture foods are cooked today does not reduce the high fat content. The present invention is capable of cooking single portions of less than ounces to more than an aggregate weight of more than 15 pounds in the same vessel, using the same amount of cooking medium. The unwanted fat is stripped away during the cooking cycle by the repeated vacuum pulse cooking flash sequence with sufficient moisture replaced at the end of the cooking cycle. Hence, the proper cooking of foodstuffs is no longer dependent upon the weight or moisture contact of a particular food. Small quantities of foodstuffs can be fully cooked using the super-saturated steam which is generated using the vacuum pulse cooking flash system.

There is one remaining potential problem. When small quantities of foodstuffs which have either a low moisture or normal moisture content are placed in the heated cooking medium and the first vacuum pulse cooking flash occurs, there may not be sufficient moisture content in the foodstuffs to maintain the vacuum pulse cooking flash cycle. If this is deemed to be the situation, super-saturated steam can be generated on a cyclic basis by the present invention.

The delay timer associated with the water solenoid valve 56 is connected to the cycle controller 30 so that the following actions can occur. Upon the closing of the lid 14, the delay timer associated with the water solenoid valve 56 is energized so as to provide water to the delivery tube 58 for a preset time. The super-saturated steam generated within the tube 58 is injected into the vessel atmosphere through the nozzle 60 as described previously. The pressure seal is made upon the injection of the steam and the expansion of the vapors. When the upper pressure limit is reached, the controller 30 opens the purge valve 44 exhausting the steam from the vessel 12. If there were no connection between the water solenoid valve 56 delay time and the controller, a small quantity of moisture foods stuffs would not cook in as short a time as expected. Nor would the foodstuffs be as fat free or taste as goods as products cooked with the present invention.

Upon reaching the low pressure limit when the controller 30 has been preset to reinitiate steam generation through the tube 58 and nozzle 60 for small quantities of low moisture or normal moisture content foodstuffs, the controller 30 signals the steam purge valve 44 to close and signals the delay timer of the water solenoid valve 56 to begin timing out a volume of water for the preset time. As the lid 14 is still closed, the delay timer is still energized and will begin timing upon receiving the controller's signal. A second quantity of super-saturated steam is generated from the super-heated water vapors in the tube 58. This second quantity of super-saturated steam immediately increases the pressure within the vessel 12 creating a vacuum pulse cooking flash. The cycle repeats for the duration of the cooking cycle creating a vacuum pulse cooking flash at the super-saturated steam is sequentially and repeatedly injected into the vessel at the low pressure limit providing the means for cooking the foodstuffs and carrying off unwanted impurities and volatiles. Hence, even small quantities of low moisture and normal moisture content foodstuffs can be cooked quickly and with little residual fats left in the product in accordance with the present invention.

The present invention may be embodied in other forms without departing from the spirit or essential attributes thereof and, accordingly, reference should be made to the appended claims, rather than to the foregoing specification, as indicating the scope of the invention.

I claim:

1. An apparatus for cooking foodstuffs in a sealed pressurized container consisting of a sealable pressure vessel having a pressure vent disposed through an upper portion of said vessel for use in cooperation with a pressure regulating means responsive to ambient pressure changes in said vessel for opening the pressure vent when the pressure in the vessel reaches a preset high pressure and for closing said pressure vent when the pressure in the vessel reaches a preset low pressure, a selectively moveable lid means attached to said vessel for use in opening and closing the vessel, a discharge orifice disposed through a lower portion for discharging a non-aqueous liquid cooking medium placed within said vessel into a reservoir and a fill orifice disposed through an upper portion of said vessel for delivering the cooking medium to the vessel, a controllable heating means for heating the cooking medium, a timing means for permitting energy to be applied to the heating means for a predetermined cooking time, and a steam injector means operable upon the closure of the lid of the vessel to generate super-saturated steam within the vessel creating an instant pressure seal and repeated vacuum pulse cooking flashes of the moisture and water contained in the foodstuffs placed within the vessel to super-saturated steam as the pressure increases and decreases in accordance with the pressure regulating means predetermined settings for at least the timed cooking period.

2. A sealed pressurized container as set forth in claim 1 wherein said pressure regulating means is responsive to pressure within the vessel for opening said pressure vent upon the vessel pressure reaching a preset high pressure of approximately 15 p.s.i.

3. A sealed pressurized container as set forth in claim 1 wherein said pressure regulating means is responsive to pressure within the vessel for closing said pressure vent upon the vessel pressure reaching a preset low pressure of approximately 10 p.s.i.

4. A sealed pressurized container as set forth in claim 1 wherein said controllable heating means is operable in response to said timing means and a thermal control means to maintain an average preset temperature over the timed cooking period.

5. A sealed pressurized container as set forth in claim 1 wherein said steam injector means is adapted to automatically initiate a series of repeated vacuum pulse cooking flashes of the moisture and water contained in the foodstuffs to super-saturated steam in accordance with the build up and release of pressure within the vessel, with the vacuum pulse cooking flashes being initiated upon the venting of the steam when reaching the high pressure limit creating a temporary partial vacuum in the vessel.

6. A sealed pressurized container as set forth in claim 1 wherein said liquid cooking medium is passed through a filtering means when discharged from the cooking vessel to the reservoir.

7. A method for cooking foodstuffs in a sealed pressurized container comprising the steps of:
    (a) immersing foodstuffs in a sealable pressure vessel containing a non-aqueous liquid cooking medium;
    (b) heating the liquid cooking medium for a predetermined cooking time;
    (c) closing a selectively moveable lid means attached to said vessel during said predetermined cooking time;
    (d) injecting super-heated water vapors into the vessel upon the closure of the lid to generate super-saturated steam within the vessel creating an instant pressure seal and initiating repeated vacuum pulse cooking flashes of the moisture and water contained in the foodstuffs placed within the vessel to super-saturated steam as the pressure within the vessel increases and decreases in accordance with pressure regulating means responsive to pressure changes in the vessel for at least the time cooking period;
    (e) upon reaching the preset pressure limit within the vessel and releasing the pressure, creating a temporary vacuum which reduces the boiling point for the moisture and water contained within the foodstuffs such that said moisture and water is flashed to steam;
    (f) resealing the vessel upon reaching the preset low pressure limit and again injecting super-heated water vapors into said vessel for increasing the pressure until the preset high pressure limit is again reached; and
    (g) conducting such repeated vacuum pulse cooking flashes until expiration of the timed cooking period.

8. The method for cooking foodstuffs as set forth in claim 7 including the additional steps of discharging the cooking medium through a discharge orifice into a reservoir under the urging of the pressure of the steam retained within the vessel after the foodstuffs are substantially cooked and the expiration of the cooking time; venting of the vessel of all steam upon completion of the discharging of the cooking medium and the final cooking flash; and removing the foodstuffs by opening the lid after the pressure within the vessel is equalized with the atmospheric pressure outside the vessel by a final venting.

9. The method for cooking foodstuffs as set forth in claim 8 including the additional step of recycling the cooking medium to the vessel after filtering the cooking medium in the reservoir.

10. The method for cooking foodstuffs as set forth in claim 7 wherein the repeated vacuum pulse cooking flashes of the moisture and water contained in the foodstuffs to super-saturated steam creates a sequenced cycle during the timed cooking period including steam pressure build-up, venting causing a temporary partial vacuum, and vacuum pulse cooking flashes from the release of additional moisture and water from the foodstuffs upon the occurrence of the temporary partial vacuum giving rise to a renewed build-up of steam pressure.

11. The method for cooking foodstuffs as set forth in claim 7 including the additional step of removing impurities, fats and other volatiles and unwanted harmful materials from the foodstuffs by the mechanical agitation of the cooking medium and the internal atmosphere of the vessel caused by the vacuum pulse cooking flashes which generates super-saturated steam and the carrying off of these impurities, fats and other volatiles and unwanted materials with the venting of the vessel of the generated steam.

12. The method for cooking foodstuffs as set forth in claim 7 wherein the repeated vacuum pulse cooking flashes of the moisture and water contained in the foodstuffs to super-saturated steam creates a bulls-eye pattern of cooking in each individual foodstuff in layered stages from the periphery inward upon the repeated occurrences of a vacuum pulse cooking flash.

13. The method for cooking foodstuffs as set forth in claim 7 including the additional step of sterilizing the foodstuffs during the repeated vacuum pulse cooking flashes of the moisture and water contained in the foodstuffs placed within the vessel to super-saturated steam during the timed cooking period.

14. The method for cooking foodstuffs as set forth in claim 7 including the additional step of reclaiming the liquid cooking medium by utilizing repeated vacuum pulse cooking flashes which generates super-saturated steam to remove impurities and other volatile materials from the cooking medium and carrying off said impurities and other volatile materials with the venting of the vessel of the generated steam.

15. The method for cooking foodstuffs as set forth in claim 7 including the additional step of stripping away the surface residue of the cooking medium from the cooked foodstuffs, removing remaining fats in the cooked foodstuffs with the steam generated by the final vacuum pulse cooking flash, and replacing the fats with moisture from said generated steam producing cooked foodstuffs having a moist inside and a crispy outside texture.

16. The method for cooking foodstuffs as set forth in claim 7 including the additional step of providing a means for initiating the injecting of super-heated water vapors into the nozzle to generate super-saturated steam within the vessel to assist in the cooking of comparatively small quantities of foodstuffs at a sequenced cyclic time in accordance with the pressure regulating means for at least the timed cooking period independently of moisture content in the foodstuffs.

17. The method for cooking foodstuffs as set forth in claim 16 wherein the comparatively small quantities of foodstuffs contain low or normal moisture content.

* * * * *